May 17, 1955
F. H. NASS
2,708,363
TENSILE TESTING APPARATUS
Filed Aug. 9, 1952
2 Sheets-Sheet 1
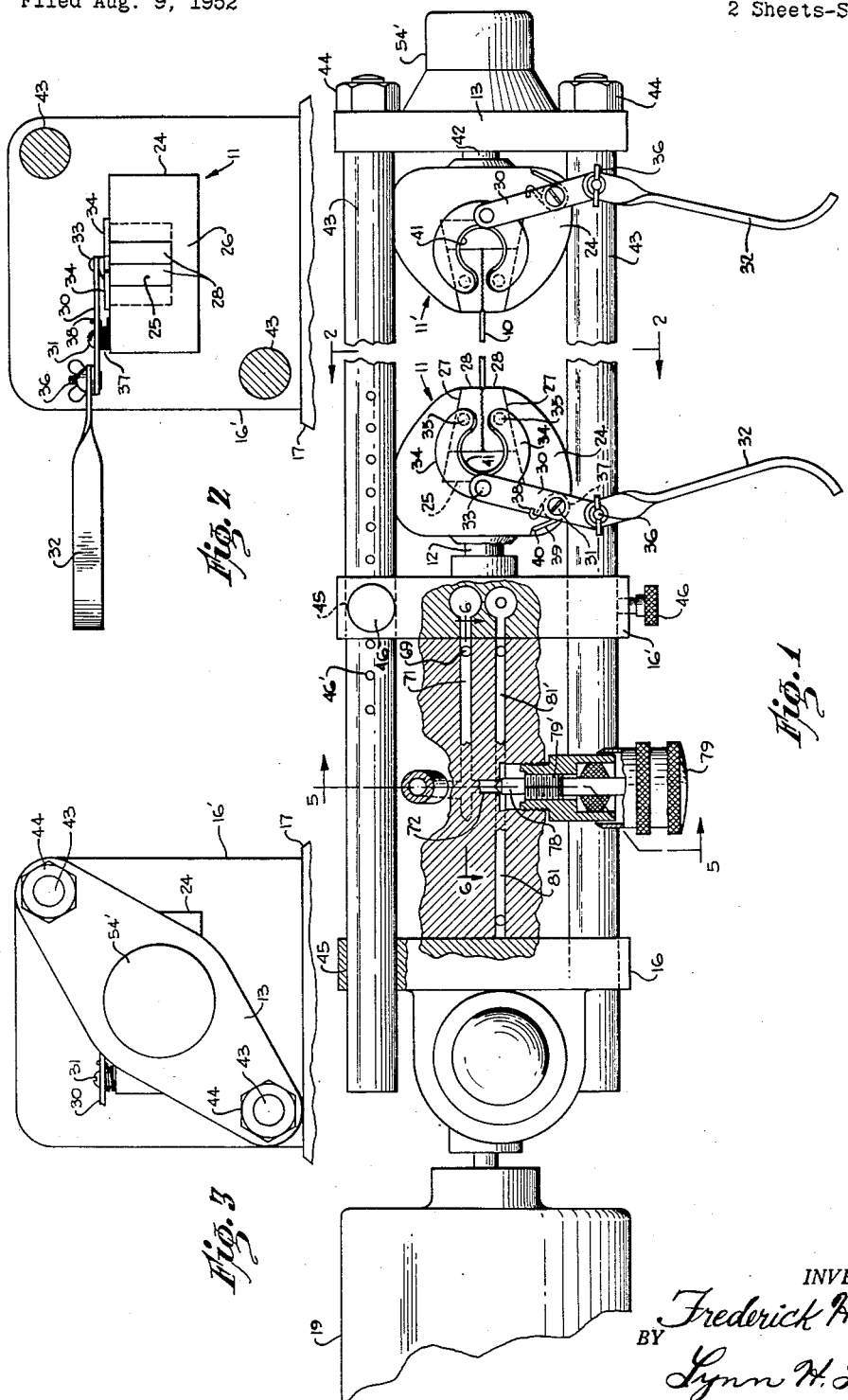
INVENTOR.
Frederick H. Nass
BY
Lynn H. Latta
ATTORNEY May 17, 1955
F. H. NASS
2,708,363
TENSILE TESTING APPARATUS
Filed Aug. 9, 1952
2 Sheets-Sheet 2
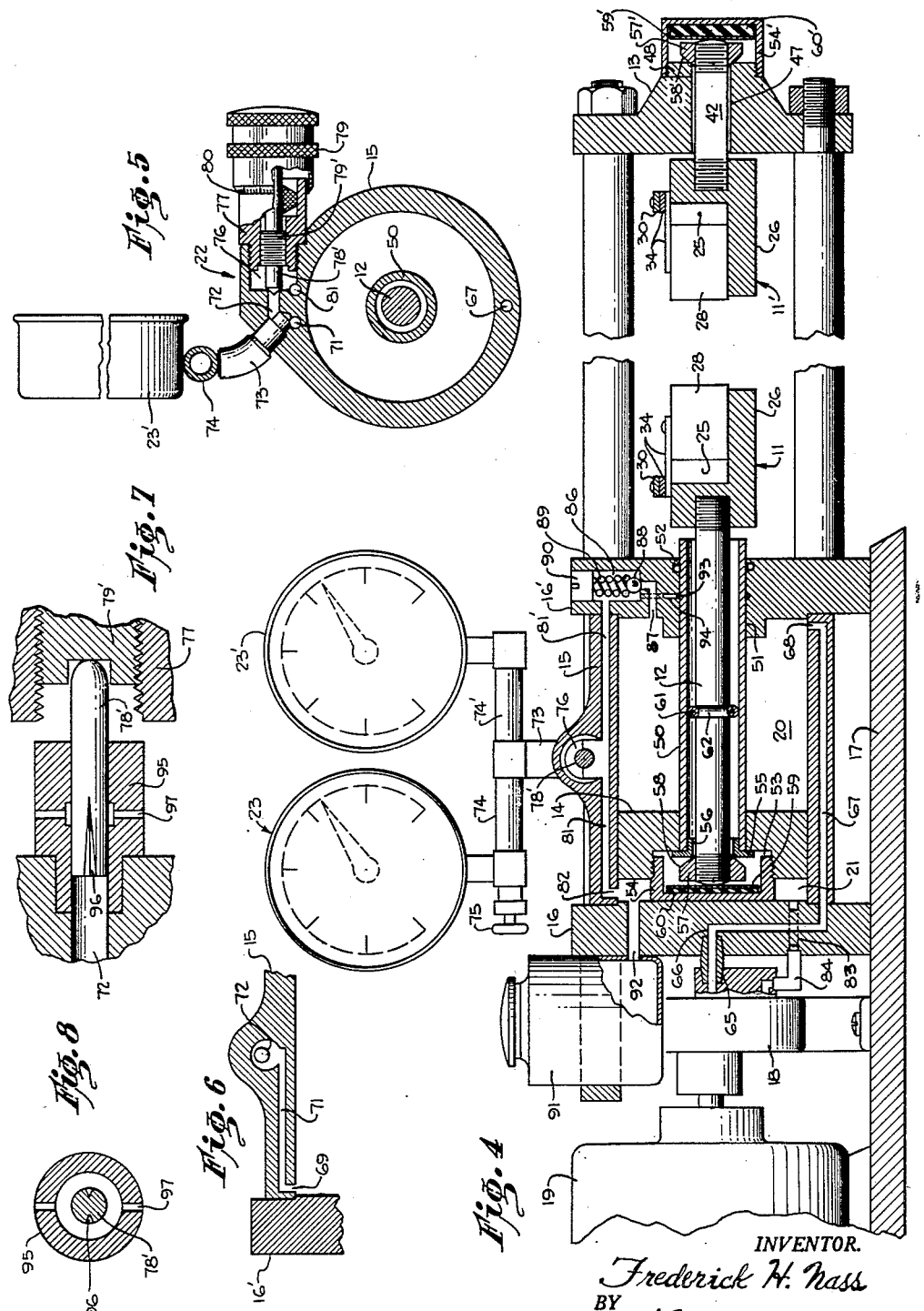
INVENTOR.
Frederick H. Nass
BY
Lynn H. Latta
ATTORNEY

United States Patent Office 2,708,363
Patented May 17, 1955

2,708,363

TENSILE TESTING APPARATUS

Frederick H. Nass, Los Angeles, Calif.

Application August 9, 1952, Serial No. 303,540

3 Claims. (Cl. 73—97)

This invention relates to apparatus for testing the tensile strength of various materials, and has as its general object to provide an improved testing apparatus of the hydraulic type, that is relatively simple in construction.

A specific object of the invention is to provide a tensile testing apparatus having an improved arrangement in which pulling action is applied directly to a pulling ram in a manner to eliminate lateral pressure loads. More particularly, the invention aims to provide a tensile testing apparatus in which the moving grip is attached to the pulling ram at the axis thereof in a manner to assure a true axial pull, relatively free from friction. These objects are attained, in general, by utilizing a hydraulic cylinder having a piston which has a rigidly attached, axial guide tube projecting axially therefrom and slidable in a head of the cylinder (thereby lengthening the guiding surface of the piston), together with a draw rod which is pivotally attached to the center of the piston and extends through the guide tube to the exterior of the cylinder, where it carries a grip for engaging one end of a specimen. Thus the pull which is applied to the specimen comes directly from the the center of the piston, and cannot develop lateral loads upon the guide tube, such as would increase the friction between the tube and its bearing. The guide tube therefore functions efficiently to seal the pressure chamber of the hydraulic unit against the escape of fluid, and at the same time prevents the piston from canting or cocking in the cylinder.

Another object is to provide a tensile testing apparatus having self aligning grips.

A further object is to provide an improved form and arrangement of wedge type grip, with means whereby the operator may open both of them at the same time, using a single hand, with the other hand free to insert a specimen between the grips.

A further object is to provide an improved hydraulic tester with variable speed operation of its ram, to provide for quick adjustment of the grip to the length of a specimen, within range of specimen length.

Another object is to provide an improved arrangement of hydraulic piston, cylinder, and end members therefor, and hydraulic passages leading from one side of the piston to one or more pressure gauges, and thence to the other side of the piston, together with a simple arrangement of hydraulic pump and fluid reservoir.

Other objects will become apparent in the ensuing specifications and appended drawings in which:

Fig. 1 is a plan view of a testing machine embodying the invention, with parts broken away and shown in section;

Fig. 2 is a transverse sectional view thereof taken on the line 2—2 of Fig. 1;

Fig. 3 is an end view of the same;

Fig. 4 is a vertical axial sectional view of the same;

Fig. 5 is a transverse sectional view taken on the line 5—5 of Fig. 1;

Fig. 6 is a detail sectional view taken on the line 6—6 of Fig. 1;

Fig. 7 is a detail enlarged sectional view of the restrictor valve; and

Fig. 8 is a cross-sectional view of the same.

General features

As an example of one form in which the invention may be embodied, I have shown in the drawings a testing machine for testing the tensile strength of specimens such as strips of sheet metal (e. g. the strips 10 shown in Fig. 1). The specimen 10 is mounted with its ends engaged between grips 11 and 11', the former being attached to a draw rod 12 and the latter being attached to a cross head 13 which is stationary in the operation of the apparatus.

Draw rod 12 forms part of a ram which includes a piston 14 slidable in a hydraulic cylinder 15. Cylinder 15 is mounted between cylinder heads 16, 16', the ends of the cylinder being sealed to and communicating with the inner faces of the cylinder heads. Cylinder heads 16, 16', are securely mounted in spaced, parallel upright positions upon a base 17.

A pump 18, driven by a motor 19 (e. g. electric motor) is arranged to pump a hydraulic liquid into a pressure chamber 20 defined between piston 14 and cylinder head 16', for moving piston 14 so as to pull grip 11 toward the cylinder unit. From a return chamber 21, defined between piston 14 and cylinder head 16, such movement of the piston expels hydraulic fluid directly back to the inlet of pump 18.

The pull applied to the specimen 10 is directly proportional to the pressure developed in pressure chamber 20. The pressure in chamber 20 is a function of the ratio between the rate at which the fluid is pumped thereinto and the rate at which it is permitted to escape past a bypass restrictor valve 22 (Fig. 5), said pressure being read on one of a pair of pressure gauges, 23, 23' communicating with chamber 20 on the near side of restrictor valve 22.

The rate of travel of piston 14 may be regulated by varying the orifice of restrictor valve 22. This provides for rapid movement of the piston 14 in shifting the grip 11 to the proper position for engagement with the particular sample being tested, the valve being opened up for this purpose, and when the sample has been attached to the grips, it is possible to build up the pressure in chamber 20 by closing down the valve on the valve orifice.

The grips

Grips 11, 11' are of improved construction, each including a grip head 24 having therein an upwardly opening, centered, axially extending recess 25, closed at its rear end, opening through the forward end of the grip head, closed at the bottom by a web portion 26 of the grip head and open at the top. The sides of recess 25 are defined by walls 27 which converge toward the open forward end of the grip, symmetrically with respect to the longitudinal axis of the grip. Mounted in recess 25 are a pair of jaws 28, of wedge shape, with parallel adjacent gripping faces and remote side faces which are inclined to correspond to the inclination of walls 27. The side faces of the jaws 28 slidably bear against the walls 27, so that movement of the jaws toward the open end of the grip head will draw them tightly into clamping engagement with the specimen 10 engaged therebetween.

The present invention provides in the grip mechanism, improved means for simultaneous actuation of the jaws 28 by one hand of the operator. Such means includes, for each grip, a lever 30, pivoted intermediate its ends, by means of a pivot 31, on one side of the grip head 24; a handle 32 being attached to the outer end of lever 30 and the inner end of the lever being connected by a pivot 33 to a pair of arcuate links 34. The pair of links together have a shape approximately that of the letter C. The ends of links 34 where they are connected to levers 30 are superimposed, the other ends being pivoted, by pivots 35, to respective jaws 28. Handles 32 are attached to levers 30 by means of wing nut bolts 36, which may be tightened to clamp the handles 32 securely to the levers 30. By loosening bolts 36 it is possible to adjust handles 32 to various positions of angular relation to levers 30, thus adjusting the handles 32 toward or from each other to suit the reach of the operator's fingers and to enable him to grasp both handles 32 simultaneously in one hand. Such adjustment becomes necessary as a correction for adjustment of grips 11, 11' to different separation distances, in accordance with different specimen lengths. Thus, irrespective of the distance between grips 11, 11', the distance between handles 32 may be adjusted to the same value for each testing operation.

Each lever 30 is urged in a direction tending to move jaws 28 forwardly (in their closing direction) by means of a mouse trap type spring 37 having an arm 38 pressing against lever 30 and an arm 39 anchored to grip head 24 by means of a finger on the end thereof bent downwardly into a recess 40 in the grip head. Spring 37 is tensioned to urge the lever 30 in the direction to move jaws 28 toward the open end of grip head 24, for closing the jaws. Movement in the opposite direction is accomplished by moving handles 30 toward each other.

Each grip includes a spreader spring 41, of C-shape to match the inner contour of the pair of links 34, the arms of the spring engaging the respective links 34 to urge them apart.

In manipulating the grips, the operator grasps handles 32 in the fingers of one hand (e. g. the right hand) and squeezes them toward each other, thus drawing the jaws 28 toward the rear ends of the respective grip heads 24. As the jaws both move rearwardly, they will be spread apart by their spreader springs 41. With the left hand, the operator then inserts the ends of the specimen 10 between the respective pairs of jaws, and simply releases the handle 32, allowing the springs 37 to move the jaws forwardly into clamping engagement with the specimen. Additional clamping pressure is subsequently derived from wedging action of jaws 28 against walls 27 as pull is applied to the grip 11.

*Adjustable anchorage of fixed jaw*

Jaw 11' is connected to cross head 13 by a stem 42. Cross head 13 is mounted at its respective ends upon the ends of strut rods 43, 43, the latter having reduced threaded ends extended through openings in cross head 13 and secured by nuts 44.

Strut rods 43 are slidably mounted in bores 45 in diagonally opposite corners of cylinder heads 16, 16', as shown in Fig. 1. They are locked against sliding movement by locking pins 46, projecting through the head 16' and through selected ones of equally spaced holes in strut rods 43.

It will now be apparent that by removing pins 46, cross head 13 may be shifted to any position, within a range of separation of grips 11, 11' (e. g. from two inches to ten inches apart). Between the positions determined by holes 46', fine adjustment may be obtained by adjusting piston 14 to various starting positions in cylinder 15, as will be pointed out more specifically hereinafter.

Stem 42 provides a self aligning connection with head 13. To this end, as shown in Fig. 4, stem 42 of grip 11' has one end secured to grip head 24 (as by threading the end of the stem thereinto) and extends through a bore 47 in cross head 13. On its other end, stem 42 has an anular abutment head which may be in the form of a nut 57' threaded thereon. Nut 57' has a rounded, approximately spherical bearing face 58' which bears against the annular edge defined between bore 47 and the outer face of cross head 13. A cap 54' is threaded onto a boss 48 projecting from the center of cross head 13, around bore 47. The end of stem 42 bears against a hardened disc 59' which is bonded to the inner face of a cushion disc 60'. Cushion disc 60' in turn is bonded to the head of cap 54'. It functions to yieldingly maintain nut 57' in bearing engagement with head 13. A universally pivotal connection between the outer end of stem 42 and head 13 is provided by nut 57', whereby the grip 11' is self aligning on the axis of pull.

*Centering of pull on movable grip*

Movable grip 11 is mounted on the outer end of draw rod 12, which may be threaded into the grip head 24 of grip 11 as shown in Fig. 4. Draw rod 12 extends through a piston guide tube 50 one end of which is mounted in a central bore in piston 14 and the other end of which is slidably mounted in a bearing bore 51 in the center of cylinder head 16'. In an outer portion of the bore 51, a seal in the form of an O-ring 52 establishes an oil seal between cylinder head 16' and the guide tube 50, to prevent loss of fluid.

Piston 14 has a cavity 53, into which is threaded a cap 54. In the bottom of cavity 53 is a bearing washer 55 of hardened metal or equivalent material, having a central, axially extending flange 56 which is piloted in the inner end of tubular piston guide tube 50. On the inner end of draw rod 12 is an annular abutment, which may be in the form of a nut 57 threaded onto shaft 12 and having a rounded approximately spherical bearing face 58 engaged against the inner margin of washer 55. The end of draw rod 12 bears against a hardened disc 59 which is bonded to the face of a compressible cushion disc 60 of soft rubber, neoprene, or equivalent material. Cushion disc 60 in turn is bonded to the head of cap 54. Cushion 60 yieldingly presses abutment nut 57 against bearing washer 55 to maintain a centered relation between shaft 12 and piston rod 50, by virtue of the piloting of the nose of nut 57 in the inner margin of washer 55.

The engagement of abutment nut 57 against bearing washer 55 provides a universally pivotal connection between shaft 12 and piston 14, such that the grip 11 may assume a position in the line of pull from the center of piston 14 to the axis of the specimen. Thus a true axial pull is provided.

An annular cushion 61 in the form of an O-ring is seated in an annular groove 62 in draw rod 12 and is engaged under compression between the draw rod and the inner wall of piston rod 50, to yieldingly center the draw rod in the guide tube 50.

*Hydraulic mechanism*

The outlet of pump 18 communicates, through a suitable connection 65, with a passage 66 extending, in head 16, out to the circumference of cylinder 15. Passage 66 communicates with a passage 67 extending axially in the wall of cylinder 15 to a port 68 which extends radially inwardly to communicate with pressure chamber 20. An outlet port 69 (Fig. 6) in cylinder 15 communicates with a passage 71 extending axially in the wall of cylinder 15 to a port 72. Port 72 (Fig. 5) communicates at one end with the valve seat of restrictor valve 22 and at its other end with a T fitting 73 leading to the pressure gauges 23, 23'. The gauges 23, 23' are connected to the ends of respective legs 74, 74' of T fitting 73, a valve 75 being provided in leg 74 to close off the connection to gauge 23 when gauge 23' is to be used. Gauge 23 is a low pressure gauge and gauge 23' is a high pressure gauge.

Restrictor valve 22 embodies a valve chamber 76, a tubular valve plug 77 threaded into chamber 76, and a valve element 78 threaded through plug 77 and having a knob 79 provided with a dial 80 for indicating, by association with a reference mark on plug 77, the degree of opening or closing of valve 78. Valve 78 cooperates with a seat at the inner end of port 72 to variably restrict the flow of fluid through port 72 into valve chamber 76.

Communicating with valve chamber 76 is a passage 81 in the wall of cylinder 15, extending axially toward cylinder head 16, and communicating with chamber 21 through a radial port 82. From chamber 21, the fluid which passes restrictor valve 22 may flow back to the inlet of pump 18 through a port 83 in cylinder head 16, and a suitable connection 84 leading from the port 83 to the pump inlet.

In Fig. 1, valve 78 is shown as a simple needle valve. A preferred type of valve, for fine control, however, is the piston valve shown in Fig. 5, 7 and 8, in which a valve piston 78' is slidable in a valve sleeve 95, and has diametrically balanced V-slots 96 to pass fluid from port 72 to valve chamber 76, through ports 97 in sleeve 95. Fluid pressure maintains piston 78' in engagement with threaded valve stem 79', which positions the piston.

For excessive pressures, I provide a safety valve comprising a valve housing 86 in cylinder head 16', a port 87 leading from chamber 20 to a seat in the bottom of housing 86, a ball valve 71 seated against this seat under the yielding pressure of a coil spring 88, and a plug 89 threaded into the upper end of housing 86 and exerting pressure against the upper end of spring 88. A passage 81' extends from chamber 86 through the wall of cylinder 15 into direct, open communication with passage 81 through chamber 76.

Any oil seeping along guide tube 50 within bore 51 under pressure from chamber 20, will be released through an annular oil collector groove 93 in head 16, and a radial duct 94, into valve chamber 86. Accordingly, O-ring 52 is not subjected to pressure, and functions simply to wipe off excess oil film clinging to the tube 50.

Any loss of fluid from the cylinder is replenished from a reservoir 91 having a bottom outlet communicating with chamber 21 through a passage 92 in cylinder head 16.

Operation

In using the apparatus for testing a specimen 10, the specimen is gripped between grips 11, 11', being attached thereto in the manner described above. The grips are first adjusted to the length of the specimen by removing pins 46 and sliding rods 43 in cylinder heads 16, 16' until the right spacing of the grips is obtained. The pins 46 are then replaced, the specimen is attached to the grips, and the motor 19 is started. If only a slight adjustment of the spacing between grips is required it may be obtained by operating pump 18 either forwardly or in reverse, as the occasion may demand, thus to move grip 11 to a desired position. Both pump 18 and motor 19 are reversible. Hydraulic fluid, pumped from the outlet of pump 18 through connection 65, flows through passages 66 and 67 and port 68 into chamber 20, exerting pressure against piston 14. This pressure is transmitted through bearing washer 55 through abutment nut 57 and draw rod 12 to grip 11. The resulting pull against the inner end of specimen 10, the outer end of which is anchored by the stationary grip 11', develops tension in the specimen which is measured by the pressure in chamber 20. As the pump continues to pump fluid into chamber 20, a portion of the fluid will escape through outlet port 69 and passage 71 past restrictor valve 22. The column of fluid in passage 71 will be subjected to the pressure in chamber 20 and this pressure will be measured upon the low pressure gauge 23 (if valve 75 is open) or upon high pressure gauge 23' (if valve 75 is closed). The buildup of pressure may be controlled by restrictor valve 22. As the valve 22 is opened, the freer escape of fluid into passage 81 will lower the pressure in chamber 20, whereas the closing down of valve 22 will raise the pressure in chamber 20 because of the added increase in the resistance to the escape of the fluid. Thus it is possible to selectively test specimens throughout a wide range of load limit values, the valve 22 being opened up for the specimens of low strength (valve 75 likewise being opened to place the reading for these specimens on gauge 23) and the valve 22 being closed down to develop higher pressures for the higher strength specimens.

By opening valve 22 wide open, it becomes possible to operate pump 18 to run the grip 11 back and forth so as to place it in a desired position for gripping the end of a specimen. In this operation, there is a relatively free flow of fluid past the valve 22, and very little pressure is developed in chamber 20.

I claim:

1. In a tensile tester: a support; a grip for clamping one end of a specimen, said grip comprising a grip head having a dove-tail shaped recess therein, open at one end, said recess having walls converging toward said open end; a pair of wedge-shaped jaws in said recess; a pair of links each pivoted at one end to a respective jaw, a pivot connecting said links to one another at their other ends said links being arranged to collectively define substantially the letter C; a generally C-shaped spreader spring conforming generally to the inner margins of said links and yieldingly engaged against the links to urge them apart for opening the jaws; and actuator means including a lever arm pivoted to said support and connected to said link-connecting pivot, a handle on said lever arm, and a torsion spring acting against said lever arm in a direction to transmit through said links to said jaws, movement of said jaws in closing direction.

2. In a tensile tester: a base; a pair of cylinder heads mounted thereon in spaced parallel relation; a cylinder extending between and sealed to said heads at its ends, said heads being generally square in marginal contour and having corner portions projecting radially beyond said cylinder, each of said heads having pair of bores in opposite corners thereof, one in a lower forward corner and the other in an upper rear corner, the bores of the respective heads being aligned; a pair of tie rods extending through respective bores and secured to said heads for maintaining the latter in engagement with the respective ends of the cylinder, one of said rods being disposed at the forward side of the tester and near the level of the base, the other rod being disposed at the rear side and near the top of the tester, said tie rods projecting beyond one of said heads to function as struts; a cross-head attached to the ends of the projecting portions of said rods, said pair of rods constituting the sole connection between said cylinder heads and cross head; a pair of axially aligned, opposed grips; a piston in said cylinder; a piston rod attached to said piston, projecting through said one cylinder head and attached to one of said grips; means attaching the other grip to said cross head; and grip operating levers connected to said grips and projecting to the said forward side of the tester, over said forward projecting rod portion.

3. In a tensile tester: a base; a hydraulic cylinder assembly mounted thereon and including a cylinder and separate heads engaged against and sealed to the respective ends of said cylinder; a piston slidable in said cylinder; a draw rod attached at one end to said piston and slidably extending through one of said heads; said piston cooperating with said one head to define within said cylinder a pressure chamber and with the other head to define within said cylinder a return chamber; a pair of grips disposed in coaxial, adjacent, opposed relation, one attached to the other end of said draw rod; a fixed anchorage attached to said cylinder assembly and supporting the other grip; a fluid pump mounted on said base adjacent said other head and having an inlet and an outlet, said cylinder having in the lower portion thereof a passage extending longitudinally thereof from said other head to a point adjacent said one head and opening into said pressure chamber, said other head having a passage extending therethrough and communicating with said pump outlet and said cylinder wall passage at its respective ends; said cylinder having, in the upper portion thereof, a pair of adjacent circumferentially spaced passages extending longitudinally thereof, and including, in said upper portion, an integral boss extending tangentially; said boss having an axial port joining said pair of passages; said boss having a valve chamber communicating with one of said pair of passages and with said port, said boss having a valve seat in said chamber and around said port; a restriction valve in said boss, cooperable with said valve seat to restrict communication between said chamber and port, said one communicating with said return chamber at its end remote from said port, the other of said pair of passages opening into said pressure chamber at its end remote from the end which joins said port, so as to communicate fluid pressure from said pressure chamber to said port; and a pressure gage communicating with said port where it joins the last mentioned passage, to register the pressure communicated by the latter; said restrictor valve being a needle valve, adjustable to provide a variable restriction to flow from said port through said one passage to said return chamber, thereby regulating the intensity of the pressure built up in said pressure chamber.

References Cited in the file of this patent

UNITED STATES PATENTS

| | | |
|---|---|---|
| 1,491,797 | Harrison | Apr. 29, 1924 |
| 1,872,047 | Templin | Aug. 16, 1932 |
| 2,001,711 | Dinzl | May 21, 1935 |
| 2,030,640 | Kinzel | Feb. 11, 1936 |
| 2,363,930 | Basquin | Nov. 28, 1944 |
| 2,436,908 | Van Weenen et al. | Mar. 2, 1948 |